April 15, 1952 W. C. KRAUTHEIM 2,592,714
RAILWAY TRUCK
Filed Oct. 1, 1945 3 Sheets-Sheet 1
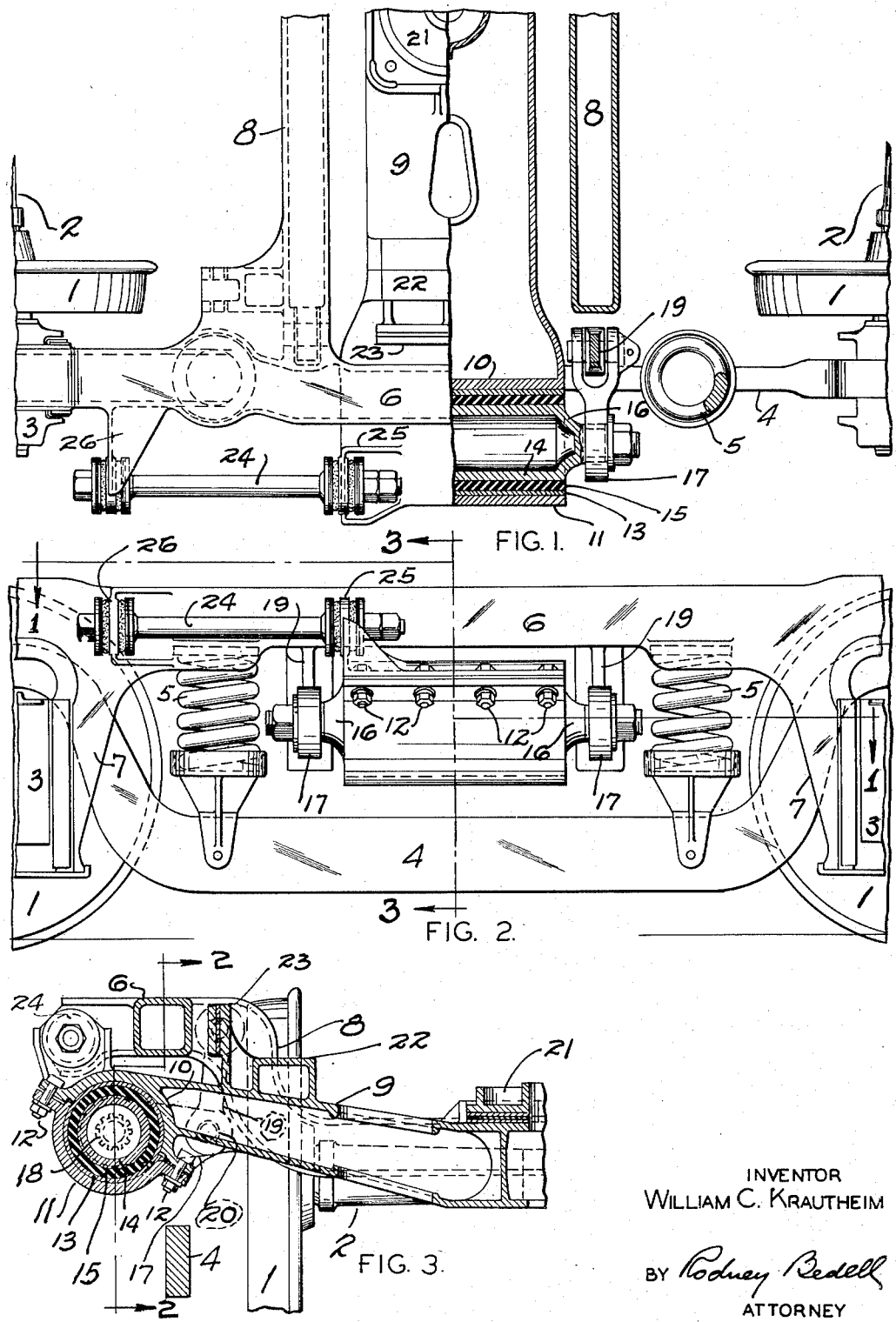
INVENTOR
WILLIAM C. KRAUTHEIM
BY Rodney Bedell
ATTORNEY April 15, 1952     W. C. KRAUTHEIM     2,592,714
RAILWAY TRUCK Filed Oct. 1, 1945     3 Sheets-Sheet 2

INVENTOR
WILLIAM C. KRAUTHEIM
BY Rodney Bedell
ATTORNEY

April 15, 1952 W. C. KRAUTHEIM 2,592,714
RAILWAY TRUCK

Filed Oct. 1, 1945 3 Sheets-Sheet 3

INVENTOR
WILLIAM C. KRAUTHEIM
BY Rodney Bedell
ATTORNEY

Patented Apr. 15, 1952

2,592,714

UNITED STATES PATENT OFFICE 2,592,714

RAILWAY TRUCK

William C. Krautheim, Normandy, Mo., assignor to General Steel Castings Corporation, Granite City, Ill., a corporation of Delaware Application October 1, 1945, Serial No. 619,611

6 Claims. (Cl. 105—190)

The invention relates to railway rolling stock and more particularly to the supporting of a truck load carrying bolster from the truck framing structure.

The main object of the invention is to support the bolster from the truck framing structure by means of a simple resilient device which will provide a softer ride than the usual arrangement consisting of coil or elliptic springs or a combination of coil and elliptic springs and which will provide for an increasing rate of resistance for dynamic overload due to irregularities in the track. Preferably this object is attained by providing a resilient device positioned between the truck framing structure and the truck bolster which includes rubber or rubber-like material placed under torsional stress or shear stress and which also includes a radially extending arm which is supported at its outer end from the truck framing structure, the rubber or rubber-like material acting as a spring to take the place of the usual coil or elliptic bolster springs ordinarily used in railway vehicle trucks.

It is a further object of this invention to extend the arm from the rubber or rubber-like material so that there will be obtained the best deflection rate under the required operating conditions. Preferably it is desired to provide an increasing rate of resistance for dynamic overloads.

Due to its increasing rate of resistance for overloads, this bolster supporting arrangement is particularly adapted for freight car trucks which are required to carry a large range of load from the light to the loaded car requirements. The arrangement is also adapted for passenger car trucks where it is desirable to provide for lateral movement of the bolster relative to the truck framing structure as the outer end of the arm may be connected to a link pivotally suspended from the truck framing structure, which links may be inclined and operated similar to the ordinary swing hangers.

Another object of the invention is to utilize the rubber or rubber-like material for cushioning lateral shocks transmitted from the truck frame to the bolster.

Another object is to utilize a resilient torsional device for supporting the truck bolster and embodying rubber or rubber-like material which has a snubbing action to control vertical movements of the bolster relative to the truck frame to a better degree than other types of springs.

Another object is to provide ready access to the resilient bolster support and to render the latter adjustable for initial installation, or subsequently, if necessary, to compensate for any set or permanent distortion of the rubber after the truck has been in service.

In the accompanying drawings illustrating the invention—

Figure 1 is in part a top view and in part a horizontal section through one longitudinal half of a four-wheel truck with the end portions broken away and is taken on the line 1—1 of Figure 2.

Figure 2 is a side elevation of the structure shown in Figure 1.

Figure 3 is a vertical transverse section taken on the line 3—3 of Figure 2.

Figure 7:
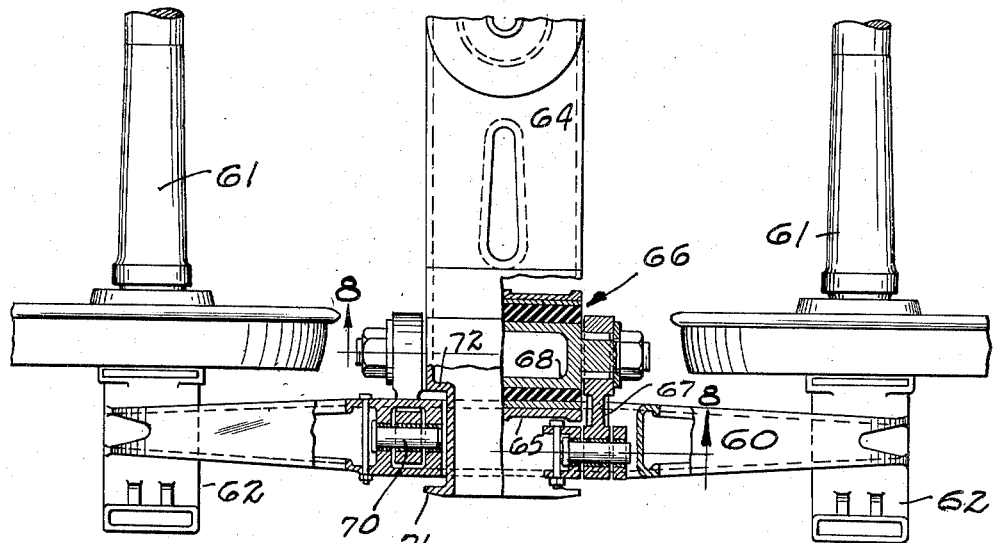
Figure 8:
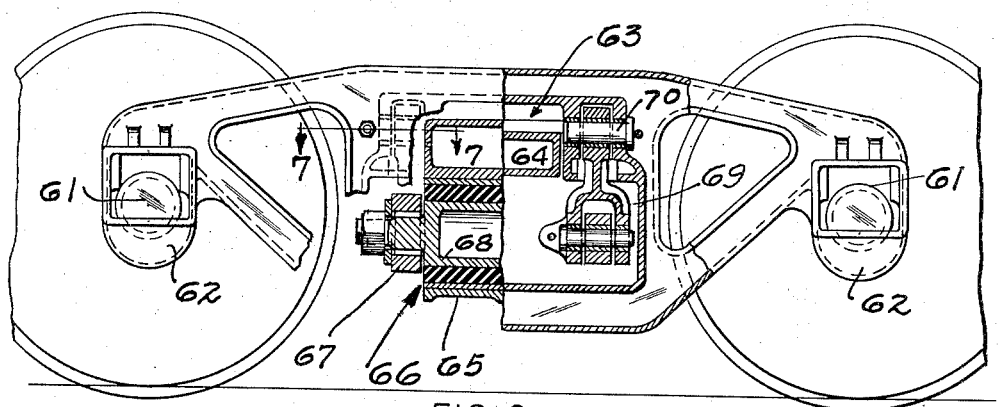
Figures 9, 10:
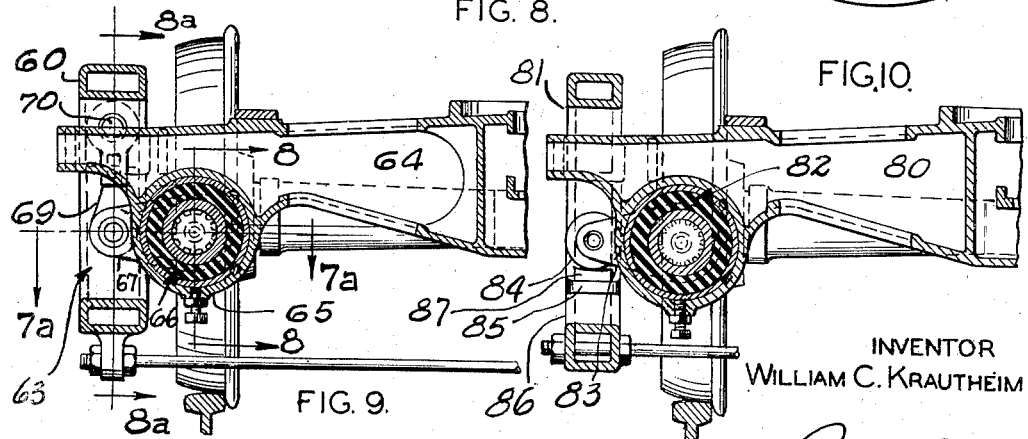

Figure 7 corresponds generally to Figure 1 but shows another form of the invention with a part at the left of the center line sectioned horizontally as indicated by the line 7—7 in Figure 8 and with a part at the right of the center line sectioned substantially horizontally as indicated by the line 7a—7a of Figure 9.

Figure 8 is a side view and longitudinal section of the structure shown in Figures 7 and 9, a part of the drawing at the left of the center line being sectioned on the line 8—8 of Figure 9 and a part at the right of the center line being sectioned along the line 8a—8a of Figure 9.

Figure 4:
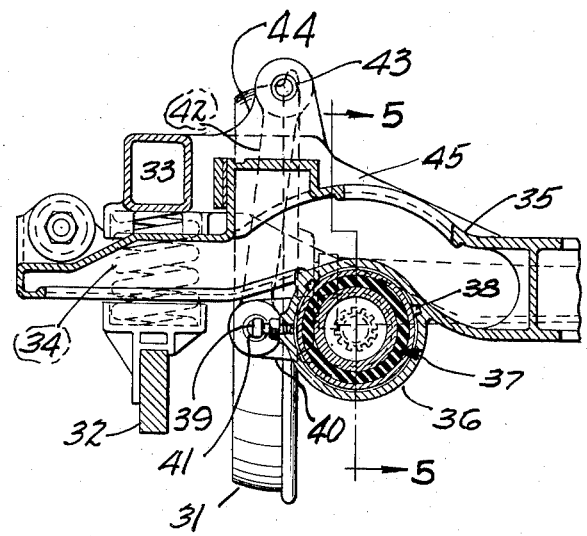
Figure 4 is a section corresponding generally to Figure 3 but illustrating another form of the invention.
Figure 6:
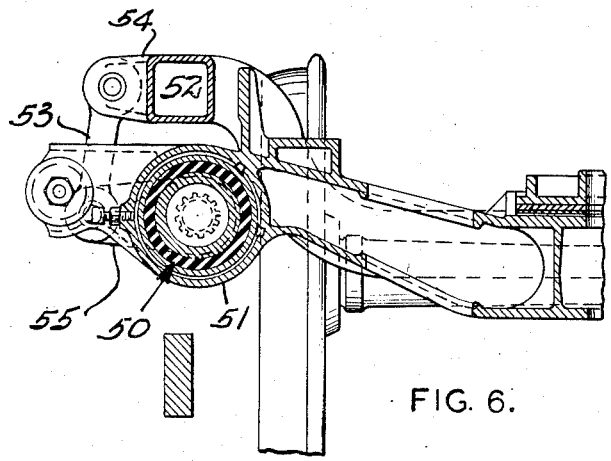
Figure 6 is a vertical section corresponding to Figure 4 but illustrating another form of the invention.

Figure 9 is a vertical transverse section corresponding to Figures 3, 4 and 6 but illustrating the structure shown in Figures 7 and 8.

Figure 10 corresponds to Figure 9 but illustrates another form of the invention.

The truck shown in Figures 1, 2 and 3 has the usual wheels 1, axles 2, boxes 3, equalizers 4, truck springs 5 seated on equalizers 4, and a truck frame here shown as a one-piece casting with wheel pieces or side members 6 having pedestal jaws 7 which slidably receive boxes 3. The frame includes transverse transoms 8.

A load-carrying bolster 9 extends transversely of the truck over equalizers 4 and beneath wheel pieces 6 and outwardly of the latter and terminates in a sleeve-like housing having its axis disposed longitudinally of the truck and including a semi-cylindrical portion 10 integral with the remainder of the bolster and a semi-cylindrical cap 11 detachably secured to portion 10 by bolts 12.

The housing 10, 11 receives a torsional spring comprising an outer cylinder 13, an inner cylinder 14 surrounded by and spaced from cylinder 13, and an intermediate cylinder 15 of rubber or similar material which will yield to torsional forces arising when cylinders 13 and 14 are rotated in opposite directions about their common axis. The outer face of rubber sleeve 15 is bonded or vulcanized to the inner face of the outer sleeve 13 and the inner face of rubber 15 is similarly secured to the outer face of sleeve 14. Bolts 12 tightly clamp outer sleeve 13 to the bolster portion 10, 11 and frictionally hold these parts against rotation. Sleeve 14 has trunnions 16 at its ends and arms 17 are secured to trunnions 16 as by splines as indicated at 18, or otherwise, so as to prevent pivotal action of the arm about the trunnions. Swing hangers 19 are pivotally suspended from transoms 8 at the inner sides of the wheel piece 6 and at their lower ends are pivotally connected to the inner ends of arms 17 by pins 20.

With this arrangement, the bolster is yieldingly supported by the torsional rubber springs at its extreme ends and outwardly from the wheel pieces and equalizers, thus rendering the bolster highly stable, notwithstanding that it is provided for lateral movement in the frame by swing hangers suspended from the inner sides of the wheel pieces.

The arms 17 are positioned horizontally under the best loading or operating condition so that when greater loads are applied to the truck bolster due to track irregularities or other service conditions the outer end of the arm swings upwardly in an arc from the horizontal position, thus shortening the effective length of the arm and providing an increasing rate of resistance due to such vertical movement of the bolster relative to the framing structure. Thus the swinging of the arm above the horizontal position provides a better control of the vertical movement of the bolster to give a better riding condition for the truck than is obtained with the usual coil or elliptic bolster springs which provide for a constant rate of deflection during compression of the springs.

The bolster has the usual center plate 21 and side bearings 22 arranged to cooperate with associated parts on the vehicle body (not shown). The bolster also has brackets 23 disposed opposite the wheel pieces 6 to limit the lateral movement of the bolster. An anchor device 24 extends lengthwise of the truck near each end of the bolster and is secured at one end to a bracket 25 on the bolster and at its other end to a bracket 26 on the truck frame. Devices of this nature are well known in the art and provide for the relative movement of the bolster and truck frame vertically and transversely of the truck but maintain the relative positions of the bolster and truck frame longitudinally of the truck.

Bolts 12, trunnions 16 and the ends of arms 17 applied thereto are readily accessible for adjustment of the torsion spring according to its yielding under the load and to compensate for any set which may develop after extended use.

Figure 5:
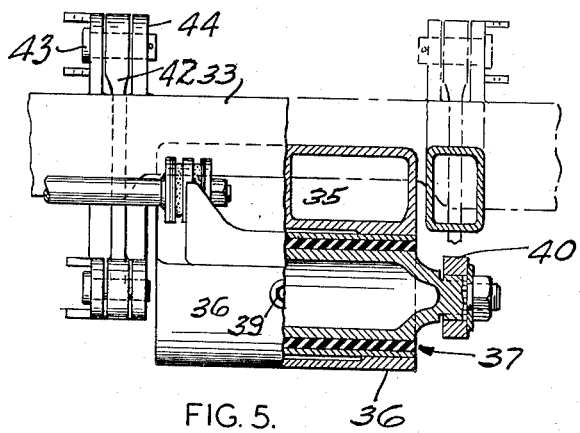
Figure 5 is in part a side elevation of the structure shown in Figure 4 and in part a vertical section taken on the line 5—5 of Figure 4 with parts in advance of the section in dot and dash lines.

Figures 4 and 5 illustrate another form of the invention in which the wheels 31, equalizers 32, truck frame wheel pieces 33 and truck springs 34 are substantially like corresponding parts shown in Figures 1–3 but the bolster 35 includes as an integral part thereof a complete cylindrical housing 36 for the torsion spring structure 37 which corresponds generally to that previously illustrated but is inserted lengthwise into the bolster housing and is held in place by keys 38, received in recesses in the casting, and by a screw 39 positioning the spring device so that it is maintained in lengthwise position in the recesses. Arms 40, secured to the ends of the inner sleeve of the torsion spring, extend outwardly of the truck beyond the spring and are pinned at 41 to the lower ends of swing hangers 42 pivotally suspended at 43 from upstanding brackets 44 on the truck frame transoms 45.

With this arrangement, the truck frame wheel pieces may be positioned at a lower level than those shown in Figures 1–3 and, if desired, the extent of the projection of the bolster and associated parts outwardly beyond the wheel pieces may be reduced.

Figure 6 illustrates another form of the invention similar to that illustrated in Figures 4 and 5 but with the bolster spring 50 and its housing 51 positioned immediately beneath the truck frame side member or wheel piece 52 and with the swing hangers 53 pivotally suspended from brackets 54 extending outwardly from the wheel piece 52. The arms 55 connecting the inner element of the torsion spring to the swing hangers extend from the spring as in Figure 4.

Figures 7, 8, and 9 illustrate another form of the invention particularly adapted for a freight car truck in which the side frame 60 is supported at its ends upon the wheeled axles 61 through axle boxes 62 integral with the side frame. The frame is provided with a window 63 through which the bolster 64 extends and the latter is provided with integral cylindrical housing structure 65 positioned inwardly of the truck from the side frame and adapted to receive a torsion spring 66 corresponding to those previously described and having arms 67 secured to the inner element 68 of the spring and extending outwardly therefrom and pivotally connected at their outer ends to the lower ends of links 69 which are pivotally suspended by pins 70 seated in bearings in the frame adjacent the upper portion of the window. Flanges 71 and 72 on the bolster face inwardly and outwardly respectively at opposite sides of the side frame and limit the lateral movement of the bolster relative to the side frame.

In the form of the invention shown in Figure 10, the bolster 80 is substantially like the bolster shown in Figure 9 and is similarly positioned relative to the side frame 81 and its spring 82 is provided with arms 83 the outer ends of which mount a roller 84 resting directly upon brackets 85 on the frame columns 86 of the side frame window, there being no link suspension of the bolster as indicated in the other forms of the invention previously described.

The bolster may move laterally of the truck by the action of roller 84. Concave wear plates 87 will act as a centering device to return the bolster to its normal position with its center plate intermediate the sides of the truck. The torsion spring and arm 83 will act the same as the corresponding parts of the other structure.

All the forms of the invention have the common feature of a torsional spring housed in the end portion of the bolster and comprising inner and outer metal sleeves with an inner device of rubber bonded to the sleeves and placed in shear by the relative rotation of the sleeves in opposite directions when the inner sleeve arm is supported by the truck frame and the bolster is subjected to load.

The structure may be varied in detail without departing from the spirit of the invention, and the exclusive use of those modifications of the structure coming within the scope of the appended claims is contemplated.

What is claimed is:

1. In a railway truck, a side frame arranged to be supported at its ends on wheeled axles and having a window between its ends, a load-carrying bolster extending transversely of the truck and terminating in a sleeve-like portion having an axis disposed longitudinally of the truck, a hollow device of rubber-like material with its outer surface affixed to the inner wall of said portion, a member secured to the inner surface of said device, links in said window at the sides of the bolster and suspended at their upper ends from the side frame and having their lower ends connected to said member to support the bolster.

2. In a railway truck, a truck frame including a wheel piece, a load-carrying bolster extending transversely of the truck and outwardly of and beneath the wheel piece and including a hollow cylinder-like portion near its outer end, the axis of which portion is disposed longitudinally of the truck and is positioned outwardly of the wheel piece, a sleeve of rubber-like material secured to the inner face of said portion, a member enclosed by and secured to the inner face of said sleeve with an end extending transversely of said portion beyond the side of the bolster, an arm on said end rigid therewith and extending therefrom inwardly of the truck beneath said wheel piece, and a hanger suspended from the truck frame at the inner side of the wheel piece to swing transversely of the truck with its lower end connected pivotally to the inner end of said arm and thereby supporting the adjacent end of the bolster at a point directly below the wheel piece.

3. In a railway truck including spaced wheel, axle, and journal box assemblies, equalizers extending between and carried on journal boxes at the same side of the truck, a frame having side members extending over the journal boxes at one side of the truck and spaced above the equalizers, a bolster extending transversely of the truck between said side members and equalizers, a portion of the bolster at each side of the truck having a cylindrical housing with its axis extending lengthwise of the truck and outwardly of the general plane of the flanges of the corresponding wheels, a rubber sleeve with its outer surface affixed to the inner face of each of said housings, a rigid shaft within and affixed to each of said rubber sleeves and provided with a rigid arm extending horizontally therefrom, and links with their upper ends pivoted to said side members and their lower ends pivoted to the swinging ends of said arms, said links, arms, and rubber sleeves forming the sole support for the bolster at points on the latter spaced apart transversely of the truck as far as the spacing of said side members.

4. In a railway truck, a truck frame including a longitudinal side member, a load-carrying bolster extending transversely of the truck and having a cylinder-like portion beneath said side member, the axis of said portion extending longitudinally of the truck, a sleeve of rubber-like material extending longitudinally of the truck beneath said side member secured to the inner face of said portion, an element enclosed by and secured to the inner face of said sleeve with an end extending beyond the side of the bolster, an arm on the end of said element and rigid therewith and extending transversely of the truck beneath said frame longitudinal side member, and a hanger suspended from said member adjacent to a side of said member and pivotally connected at its lower end to the swinging end of said arm.

5. A railway truck as described in claim 4 in which the arm on the end of the sleeve enclosed element extends outwardly of the truck from the sleeve, and the hanger is suspended from the outer side of the truck frame longitudinal side member.

6. A railway truck as described in claim 3 in which the arm on the end of the shaft within the rubber sleeve extends outwardly of the truck from the end of the sleeve, and the upper ends of the arm-supporting links are pivoted to the outer sides of the frame side members.

WILLIAM C. KRAUTHEIM.

REFERENCES CITED

The following references are of record in the file of this patent:

UNITED STATES PATENTS

| Number | Name | Date |
| --- | --- | --- |
| 348,741 | Hubbard | Sept. 7, 1886 |
| 2,052,640 | Martin | Sept. 1, 1936 |
| 2,061,767 | Hobson | Nov. 24, 1936 |
| 2,260,508 | Chambers | Oct. 28, 1941 |
| 2,268,439 | Beebe | Dec. 30, 1941 |
| 2,320,085 | Ledwinka | May 25, 1943 |
| 2,330,305 | Muchnic | Sept. 28, 1943 |